United States Patent [19]
Chafin et al.

[11] 4,422,494
[45] Dec. 27, 1983

[54] VIBRATORY FORMING OF SHAPED LEAD JOINTS

[75] Inventors: William J. Chafin, Alexandria; Ben C. Brown, Muncie, both of Ind.

[73] Assignee: General Motors Corporation, Detroit, Mich.

[21] Appl. No.: 259,975

[22] Filed: May 4, 1981

[51] Int. Cl.³ .................... B22D 19/04; B22D 23/06
[52] U.S. Cl. ..................................... 164/80; 164/108; 164/109; 164/DIG. 1; 228/110; 228/901
[58] Field of Search ............... 164/71.1, 80, 108, 109, 164/501, DIG. 1, 76.1, 511, 260, 270.1, 492, 498; 228/58, 110, 263 R, 901

[56] References Cited

U.S. PATENT DOCUMENTS

| | | | |
|---|---|---|---|
| 2,883,443 | 4/1959 | Ruetschi et al. | 429/161 |
| 3,056,192 | 10/1962 | Jones | 228/263 R X |
| 3,259,525 | 7/1966 | Wilson | 164/108 X |
| 3,912,544 | 10/1975 | Sabatino | 164/109 X |
| 3,947,290 | 3/1976 | Matter et al. | 228/901 X |
| 4,322,597 | 3/1982 | Hooke | 228/58 X |

FOREIGN PATENT DOCUMENTS 498130  5/1976  U.S.S.R. ............................. 228/110

Primary Examiner—Gus T. Hampilos
Assistant Examiner—J. Reed Batten, Jr.
Attorney, Agent, or Firm—Lawrence B. Plant

[57] ABSTRACT

Ultrasonically joining a plurality of discrete lead parts into a shaped, substantially metallurgically homogeneous joint. Preshaped lead pieces are placed in an ultrasonically vibrated mold for fusing the pieces and shaping the joint. The method is exemplified in the making of terminal posts for Pb-acid storage batteries.

4 Claims, 13 Drawing Figures

VIBRATORY FORMING OF SHAPED LEAD JOINTS

BACKGROUND OF THE INVENTION

This invention relates to joining a plurality of discrete solid lead parts together so as to form a substantially metallurgically homogeneous joint having a predetermined shape. More specifically, this invention relates to forming a substantially metallurgically homogeneous battery element terminal post from the distal ends of a plurality of Pb-acid storage battery plate lugs.

Lead-acid storage batteries comprise essentially a container divided into a plurality of compartments each of which contains an electrochemically active cell element immersed in $H_2SO_4$. The cell elements comprise a stack of alternating positive and negative polarity plates separated one from the other by a thin, microporous sheet known as a separator. Each of these plates typically comprises a leady active material pasted onto a reticulated lead, or lead alloy, structure called a grid. The grid supports the active material relative to the other plates in the element and conducts electrical current throughout the plate. In most commercial batteries the grids each have a lug projecting therefrom which serves to join the plate to other plates of like polarity within the cell element (e.g. all positive polarity plates) via a lead bar known as a plate strap. The plate strap usually includes a post, or the like, projecting therefrom for connecting the element to a terminal of the battery or to another plate strap post in an adjacent cell compartment. In either case the plate strap post typically passes through an aperture in the container or its cover and is sealed in the aperture to prevent leakage of $H_2SO_4$ out of the compartment.

The lead required for the plate strap adds considerable weight to the battery and the extra steps required to manufacture and assemble the straps add to the production costs of the battery. Attempts have been made to eliminate the heavy and costly plate straps and to simply bundle the plate lugs together into a cell element terminal post which functions like the plate strap post. Ruetschi et al U.S. Pat. No. 2,883,443, for example, bundles the plate lugs together to form a joint and mechanically presses the joint to deform it into a cylindrical post for joining directly to a battery terminal. Such mechanically formed joints tend to have oxides and impurities at the interfaces between adjacent lugs which increase the electrical resistance of the joint, are oft times very difficult to seal in their apertures owing to the generally poor exterior conformation and surface resulting from cold forming alone and can delaminate or separate if poorly handled. Finally the cracks remaining between the lugs can wick electrolyte up into the post to the general detriment of the battery.

It is the principal object of the present invention to provide a process for vibratorily joining and shaping the distal ends of the several plate lugs of a Pb-acid storage battery element into a substantially metallurgically homogeneous joint or post for connecting the element to the battery's other electrochemical elements or its terminals.

It is another object of the present invention to provide a process for joining a variety of discrete, solid lead parts and shaping the joint formed therebetween.

These and other objects and advantages of the present invention will be more readily apparent from the detailed description thereof which follows.

BRIEF DESCRIPTION OF THE INVENTION

A particular application of the present invention comprehends a process for the fusion, coalescence, molding and resolidification of a plurality of lead-acid storage battery plate lugs into a shaped cell element post by means of a vibratory mold oscillating at a frequency sufficiently high (e.g. ultrasonic) to melt the lead or lead alloy lugs. However, the process is equally applicable to other situations requiring metallurgically homogeneous shaped lead joints. As used herein the term lead is intended to include not only pure lead but also other lead-based alloys containing such alloyants as antimony, calcium, tin, strontium, etc. as are commonly found in Pb-acid storage battery components as well as solders and other low melting lead alloys.

In accordance with the invention, the distal ends of several lead plate lugs are gathered together into a cluster, positioned within a vibratory mold having a mold cavity therein conforming substantially to the shape of the cluster and the desired shape of the joint, and then subjected to high frequency mechanical vibration (i.e. ultrasonic) sufficient to melt the lugs and cause the melt therefrom to conform to the shape of the mold cavity. The several melted lugs coalesce in the mold and upon cooling and resolidification form a unified joint having a substantially homogeneous metallurgical microstructure. The process of the present invention effectively: negates the resistive affects of impurities and oxides on the surfaces of the lugs by distributing them harmlessly throughout the melt; molds a perfectly shaped readily sealable smooth surfaced post; provides a joint which is free of internal cracks, crevices, fissures or the like through which $H_2SO_4$ can wick; and provides a joint which is not subject to delamination.

In the one embodiment of the invention the lugs are each essentially rectangular and the plate lug cluster formed therefrom, in the as-gathered state, has a box-like (i.e. rectangular parallelepiped) shape. This initial box-like shape is mechanically reshaped into a right circular cylinder prior to fusing. This is preferably accomplished in several stages and so as to preclude thinning out or necking down of the lugs on the ends of the cluster, which reduces their strength and limits their ability to effectively carry high currents. In the first stage the cluster is initially preformed into a generally S-shaped configuration and in a second stage the S-shaped cluster is further deformed into a cylinder the size and shape of which conforms approximately to the size and shape of the mold cavity in the vibratory mold. Thereafter the joint is molded according to the method outlined above.

DESCRIPTION OF A SPECIFIC EMBODIMENT OF THE PRESENT INVENTION

The following describes one method making a cylindrical battery element post from a plurality of rectangular battery plate lugs and is given in conjunction with the attached drawings in which:

FIG. 6b is a view similar to FIG. 5 following reshaping of the lug cluster in the tool of FIG. 6a;

FIG. 7b is a view similar to that of FIG. 6b following reshaping by the tool shown in FIG. 7a;

Figure 1:
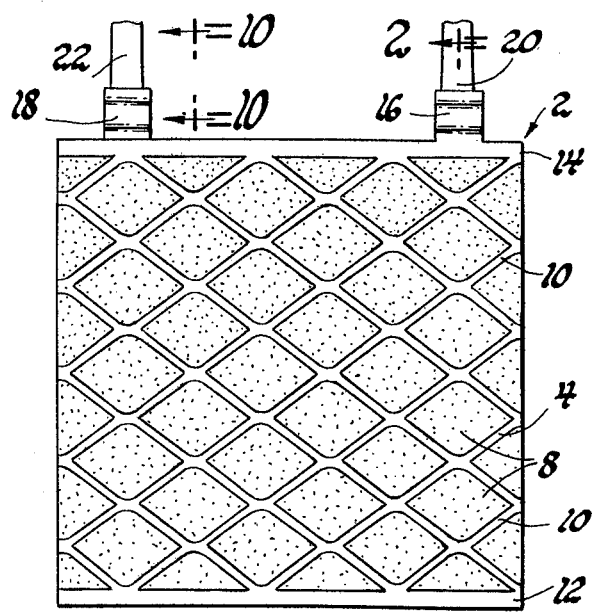
FIG. 1 is a front elevational view of a multi-plate lead-acid storage battery element.
Figure 2:
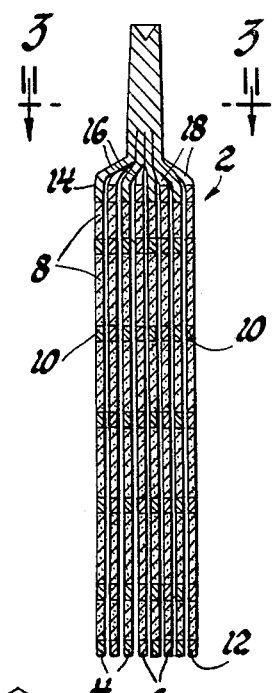
FIG. 2 is a sectioned side elevational view in the direction 2—2 of FIG. 1.
Figure 3:
FIG. 3 is a top view in the direction 3—3 of FIG. 2.

FIGS. 1–3 depict a lead-acid storage battery element 2 comprising a plurality of positive polarity plates 4 interspersed a plurality of negative polarity plates 6. Each plate comprises leady (i.e. Pb, PbO$_2$) active material mass 8 supported by a network of criss-crossing, intersecting grid wires 10 defining the support grid. A bottom grid border 12 supports the plate in the container and an upper current border 14 functions as a current collecting header for the grid. The current collecting border 14 carries at least one plate lug which is joined to the lugs of other plates of like polarity in each element. In this case, the lugs 16 for the several positive plates 4 are gathered together into one rectangular shaped cluster 24 (see FIG. 4) while the lugs 18 for the several negative plates 6 are gathered together into another cluster. The distal ends of the lugs forming the clusters are then fused and reshaped in accordance with the process of the present invention to yield a cylindrical cell element post 20 of positive polarity and a cell element post 22 of negative polarity. It is to be appreciated however that the posts may have other shapes as well and the process of the present invention permits considerable flexibility in this regard. For example, in some designs the posts might better be left rectangular conforming substantially to the shape of the lug cluster in the as-gathered condition. In such an instance no initial preforming of the cluster is required such as will be discussed hereinafter for cylindrical posts.

Figure 4:
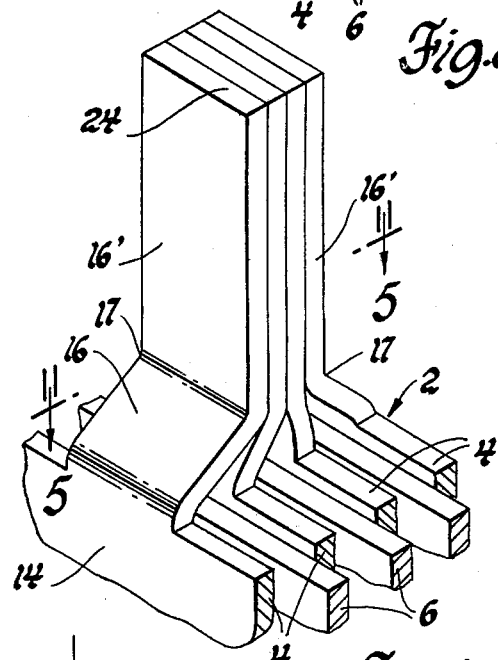
FIG. 4 is a perspective view of one of the lug areas of a battery element illustrating the distal ends of the plate lugs gathered together into a cluster prior to being formed into a post in accordance with the process of the present invention.
Figure 5:
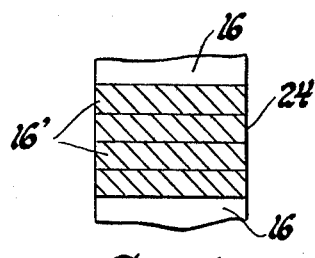
FIG. 5 is a top sectional view in the direction 5—5 of FIG. 4.
Figure 6B:
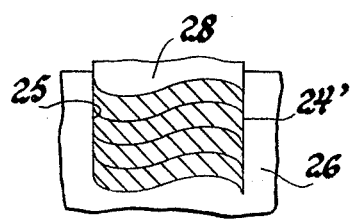
Figure 6A:
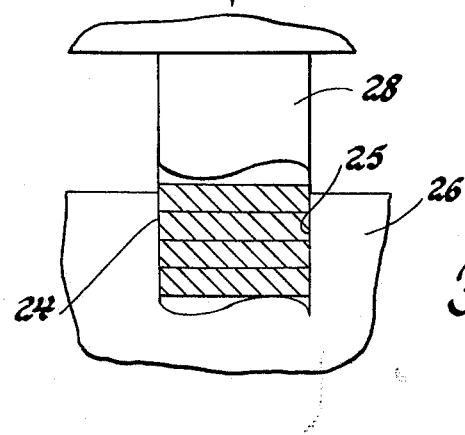
FIG. 6a is a plan view of a first stage preforming tool for reshaping the lug cluster.
Figure 7A:
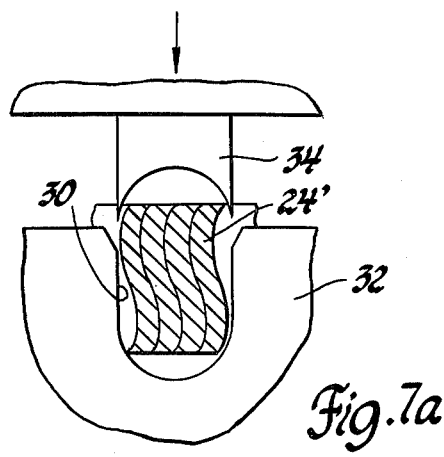
FIG. 7a is a second stage preforming tool for reshaping the lug cluster of FIG. 6b.
Figure 7B:
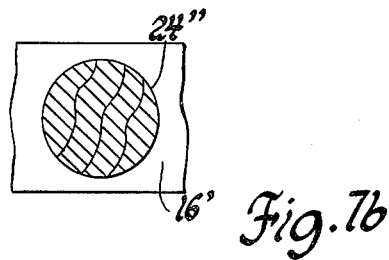

FIG. 4 depicts an enlarged perspective view of the lug area of a battery cell element 2. The Figure shows the distal ends of the positive lugs 16 gathered together into a sandwich-like cluster 24. A similar cluster for the lugs of the negative plates 6 would be formed at the other end of the element 2. As indicated above this rectangular shaped cluster 24 could be immediately fused and molded into a rectangular post where such a post would be acceptable. Preferably however the cluster 24 will be reshaped to provide a cylindrical post 20. To this end, the cluster 24 is first mechanically preformed or reshaped substantially into a cylinder (albeit imperfect) prior to fusing, molding and resolidification. Preferably this mechanical reshaping of the cluster 24 is accomplished in two stages and such as to prevent necking down or thinning of the end lugs 16' of the cluster at their roots 17 where they merge with the cluster 24. FIGS. 5–7 depict the initial, intermediate and final configuration of the lugs in the cluster at the different stages as well as the tooling employed to effect the reshaping. FIG. 5 shows the cluster 24 with its lugs 16 in the as-gathered condition and prior to preforming. The first preforming stage is depicted in FIGS. 6a and 6b. The cluster 24 is placed in the cavity 25 of a female die member 26 and deformed therein by the mating male die member 28 to form the generally S-shaped cluster 24' illustrated in FIG. 6b. Thereafter and in the second separate preforming operation illustrated in FIGS. 7a and 7b the S-shaped cluster 24' is placed in the cavity 30 of a female die 32 and acted upon by a mating male die 34 so as to mechanically form the cylindrical lug cluster 24" depicted in FIG. 7b. This two stage mechanical preforming essentially precludes necking down or otherwise thinning out of the outside lugs 16' such as might occur were the as-gathered cluster 24 mechanically deformed into a cylinder in a single die forming stage.

Figure 8:
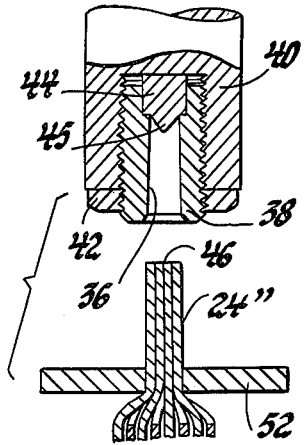
FIG. 8 is a sectional side elevational view showing the reshaped lug cluster prior to insertion into the vibratory mold.
Figure 9:
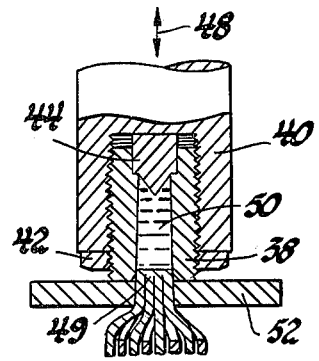
FIG. 9 is a partially sectioned front elevational view of the fused lug cluster in the vibratory mold following the application of ultrasonic vibrations thereto.

Following preforming, the lug cluster 24" is inserted into the circularly cylindrical mold cavity 36 of a vibratory mold 38 as best shown in FIGS. 8 and 9. The vibratory mold 38 takes the form of an insert threaded into the action end of an ultrasonic horn 40 of conventional construction. A lock nut 42 prevents displacement of the mold insert 38 with respect to the horn 40. Hence not only is mold maintenance facilitated, but a variety of replaceable molds of different sizes and shapes for different applications may be employed with a single untrasonic horn 40. A plug 44 having a conical tip 45 thereon is provided at the bottom of the mold cavity 36 to improve the efficiency of the mold-joining operation. In this regard, it has been observed that when the mold and cluster begin to vibrate the melting begins at distal end 46 of the lug cluster 24" and proceeds downward therefrom toward the roots 17 of the lugs 16. Experience has shown that when conical plugs 44 at the bottom of the mold cavity 36 contact the distal end 46 of the cluster 24" a more rapid and more complete melting and coalescence of the cluster can be obtained. Moreover the conical plug 44 is instrumental is reducing the amount of downward pressure that must be applied by the horn 40 on the cluster during the mold-joining operation.

Figure 10:
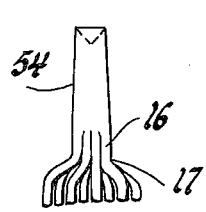
FIG. 10 is a side elevational view of the finished terminal post taken in the direction 10—10 of FIG. 1.
Figure 11:
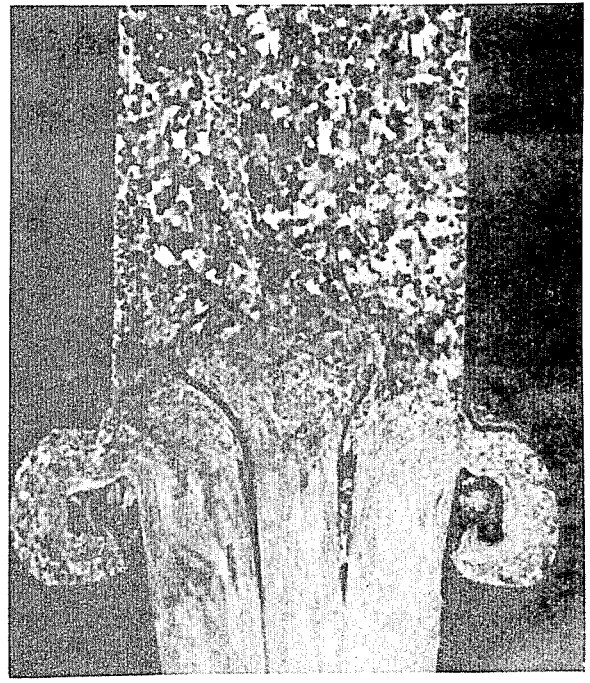
FIG. 11 is an enlarged photomicrograph of a section taken through the center of a resolidified cluster of plate strap lugs which section lies in a plane perpendicular to the lug faces so as to pass through what would otherwise be the interfaces between contiguous lugs had they not been fused together.

During the mold-joining operation and as best illustrated in FIGS. 8 and 9 the lug cluster 24" is held tightly together and in position with respect to the mold 38 by means of clamps 52. When the mold 38 is placed over the cluster 24" and the horn 40 energized, the cluster 24" fuses and coalesces into a melt 50 which conforms to the shape of the cylindrical cavity 36. Following deenergization of the horn 40, resolidification of the melt 50 and removal of the mold 38, the post will have a smooth external surface 54 (see FIG. 10) and a substantially homogeneous metallurgical microstructure such as is shown in FIG. 11. FIG. 11 is an enlarged photomicrograph of a section taken through the center of resolidified post perpendicular to the faces of the lugs 16. The particular alloy shown in FIG. 11 comprises about 0.07% Ca, about 0.5% Sn and the balance principally lead.

Commercially available ultrasonic horns such as are typically used for the ultrasonic welding of plastics and which operate at frequencies around 20,000 kilohertz have been used effectively with the present process. Likely lower frequencies would also be effective so long as the mechanical vibrations applied to the cluster are of sufficient intensity to melt the lead. The ultrasonic energy is applied axially with respect to the cluster 24″ (i.e. vertically in the drawings) as indicated by the reciprocating arrows 48 in FIG. 9. The length of time that the energy is applied will vary with the size of the cluster, the precise metallurgy of the lead, the amount of the cluster sought to be melted/resolidified and of course the frequency used. Preferably most of the cluster is melted to virtually fill the mold cavity 36 with melt 50. Some unmelted material 49 should remain in the mouth of the mold cavity 36 to act as a plug to prevent run-out of the melt 50. Shorter intervals will result in melting only distal end 46 of the cluster 24″ whereas prolonged periods will actually cause the melt 50 to run out of the mouth of the mold cavity 36. Hence some trial and error may be necessary for any given combination of the above variables to determine the precise mold-joining parameters required for specific jobs.

In one specific example of the invention four lead (i.e. 0.07% Ca, 0.05% Sn) plate lugs having a thickness of 0.106 cm and a width of 0.629 cm were laid face-to-face to form a cluster having a thickness of 0.424 cm. Thereafter the cluster was processed through the two preform stages discussed above to produce a generally cylindrical cluster having a diameter of about 0.584 cm. The thusly deformed cluster was inserted into an essentially cylindrical mold cavity which tapered slightly inwardly from the mouth thereof toward the conical plug at the bottom thereof to provide a slight draft angle for ease in removing the post from the mold. The taper was such as to provide a loose fit for cylindrical cluster for about half of the insertion distance and then a slightly interference fit thereafter as the distal end of the cluster approached the conical plug. The mold was oscillated at a frequency of 20,000 kilohertz during insertion of the preformed cluster, and approximately 90 percent of the preform had fused and resolidified in a period of about three (3) seconds between the time insertion began and the time the resolidified post was removed from the mold.

Though particular utility is found herein in joining lead-acid storage battery plate lugs the invention is seen to also be applicable to the joining of a variety of lead parts. Hence while the invention has been disclosed primarily in terms of a specific embodiment thereof it is not intended to be limited thereto but rather only to the extent set forth in the claims which follow.

The embodiments of the invention in which an exclusive property or privilege is claimed are defined as follows:

1. A process for forming a substantially metallurgically homogeneous shaped joint between discrete, solid lead parts comprising the steps of:
    gathering said parts together in contacting relationship to form a cluster;
    positioning a mold about said cluster, said mold having a cavity therein for receiving and molding said cluster into a desired shape conforming substantially to said cavity;
    subjecting said cluster to high frequency mechanical vibrations of sufficient intensity to melt said parts and cause the melt so formed to assume said shape in said cavity;
    allowing said melt to resolidify into a substantially metallurgically homogeneous mass constituting said joint; and
    removing said joint from said mold.

2. A process for forming a substantially metallurgically homogeneous, shaped joint between a plurality of discrete, solid lead parts comprising the steps of:
    gathering said parts together in contacting relationship to form a cluster;
    mechanically preforming said cluster of parts to approximately a desired shape;
    positioning a vibratory mold about said preformed cluster for vibrating said cluster, said mold having a cavity therein for receiving and molding said cluster into said shape conforming substantially to said cavity;
    subjecting said cluster to high frequency mechanical vibrations of sufficient intensity to melt said parts and cause the melt so formed to assume said shape in said cavity;
    allowing said melt to resolidify into a substantially metallurgically homogeneous mass; and
    removing said shaped mass from said mold.

3. In the process of assembling a lead-acid storage battery cell element comprising the principal steps of interspersing a plurality of positive polarity plates alternately among a plurality of negative polarity plates said plates each having a lead lug thereon for electrically communicating said plate with like-polarity plates in said element, gathering said lugs of like polarity plates together in contacting relationship to form a cluster, and shaping said cluster into a terminal post for said element, the improvement comprising:
    positioning a vibratory mold about said cluster, said mold having a cavity therein for receiving and molding said cluster into a single unit conforming substantially to the shape of said cavity;
    subjecting said cluster to high frequency mechanical vibrations of sufficient intensity to melt said lugs and cause the melt so formed to assume the shape of said cavity;
    allowing said melt to resolidify into a substantially metallurgically homogeneous terminal post; and
    removing said mold from said post.

4. In the process of assembling a lead-acid storage battery cell element comprising the principal steps of interspersing a plurality of positive polarity plates alternately among a plurality of negative polarity plates said plates each having a substantially rectangular lead lug thereon for electrically communicating said plate with like-polarity plates in said element, gathering said lugs of like polarity plates together in contacting relationship to form a cluster, and shaping said cluster into a substantially cylindrical terminal post for said element, the improvement comprising:
    said shaping including a first die-forming stage where said cluster is initially deformed into a generally S-shaped configuration and a second die-forming stage where said S-shaped cluster is further deformed into a cylindrical configuration, said die-forming stages being such as to prevent any substantial thinning out of the end lugs of the cluster;
    positioning a vibratory mold about said die-formed cylindrical cluster, said mold having a cavity therein for receiving and molding said cluster into a single unit conforming substantially to the shape of said cavity;

subjecting said cluster to high frequency mechanical vibrations of sufficient intensity to melt said lugs and cause the melt so formed to assume the shape of said cavity;

allowing said melt to resolidify into a substantially metallurgically homogeneous terminal post; and removing said mold from said post.

* * * * *